(12) United States Patent
Yaeger (10) Patent No.: US 8,454,829 B2
(45) Date of Patent: Jun. 4, 2013

(54) SPIRAL CROSSFLOW FILTER

(76) Inventor: Scott P. Yaeger, LaPorte, IN (US)

( * ) Notice: Subject to any disclaimer, the term of this patent is extended or adjusted under 35 U.S.C. 154(b) by 682 days.

(21) Appl. No.: 12/586,770

(22) Filed: Sep. 28, 2009

(65) Prior Publication Data

US 2010/0078378 A1 Apr. 1, 2010

Related U.S. Application Data

(60) Provisional application No. 61/100,917, filed on Sep. 29, 2008.

(51) Int. Cl.
*B01D 63/10* (2006.01)

(52) U.S. Cl.
USPC ............ 210/321.74; 210/321.77; 210/321.83; 210/321.86; 210/488; 210/493.1; 210/493.2; 210/493.4; 210/493.5; 210/497.01; 210/497.1

(58) Field of Classification Search
USPC ............... 210/649, 650, 767, 321.74, 312.75, 210/321.76, 321.77, 321.83, 321.84, 321.85, 210/321.86, 488, 493.1, 493.2, 493.4, 493.5, 210/497.01, 497.1
See application file for complete search history.

(56) References Cited

U.S. PATENT DOCUMENTS

| | | | |
|---|---|---|---|
| 3,386,583 A | 6/1968 | Merten | |
| 4,230,463 A * | 10/1980 | Henis et al. | 95/47 |
| 4,765,906 A | 8/1988 | Downing et al. | |
| 4,834,881 A | 5/1989 | Sawada et al. | |
| 5,266,195 A | 11/1993 | Hopkins | |
| 6,190,557 B1 | 2/2001 | Hisada et al. | |
| 6,702,941 B1 | 3/2004 | Haq et al. | |
| 7,169,418 B2 | 1/2007 | Dalton et al. | |
| 2002/0162784 A1 | 11/2002 | Kohlheb et al. | |
| 2003/0024868 A1 | 2/2003 | Hallan et al. | |
| 2006/0219635 A1 | 10/2006 | McCague et al. | |

FOREIGN PATENT DOCUMENTS

| | | |
|---|---|---|
| JP | 2003-275545 | 9/2003 |
| WO | WO-93-22038 | 11/1993 |
| WO | WO-2005/094963 | 10/2005 |

OTHER PUBLICATIONS

Anonymous, "Use of radio frequency/infrared energy to reduce spiral wound reverse osmosis element manufacturing time," Research Disclosure, Mason Publications, Hampshire, GB, vol. 405, No. 58, Jan. 1, 1998.

* cited by examiner

*Primary Examiner* — John Kim
(74) *Attorney, Agent, or Firm* — K&L Gates LLP (57) ABSTRACT

The present disclosure describes a spiral cross-flow filter. The spiral cross-flow filter includes a filter element having a continuous web of leaves formed by pleating a laminate filter element. The filter element may include a composite filter material including a first layer of a membrane material adjacent an outer shell, and a second layer of a permeate spacer material adjacent a permeate tube. The plurality of leaves wrap around the permeate tube in a uniform "spiral" configuration and may be separated by feed spacers.

22 Claims, 7 Drawing Sheets

SPIRAL CROSSFLOW FILTER

CROSS-REFERENCE TO RELATED APPLICATION

The present application claims the benefit under 35 U.S.C. §119(e) of U.S. Provisional Patent Application No. 61/100,917, filed Sep. 29, 2008, which is incorporated by reference herein.

FIELD OF TECHNOLOGY

The present disclosure relates to improved spiral crossflow filters and methods involving spiral crossflow filters.

BACKGROUND

Crossflow filtration is a type of membrane filtration that can be used when a fluid carries an amount of solid material that could plug a "dead end" filter. Crossflow filtration is different from dead end filtration. In dead end filtration, the feed is passed through a membrane or bed, trapping the retentate in the membrane or bed, and releasing the filtrate through the membrane or bed. Generally in dead end filtration, the only way for the feed fluid to exit the filter is through the membrane. In crossflow filtration, however, the feed is passed across the filter membrane (tangentially to the filter membrane) at some pressure, concentration, or other differential between the feed and the filtrate on the other side of the membrane. Material which is smaller than the membrane pore size passes through the membrane as filtrate. Some of the feed is trapped in or on the membrane as retentate, while the remaining feed flow passes across the filter on the feed side without passing through the membrane or becoming trapped in or on the membrane. The unfiltered feed flow exiting the filter is kept separate from the filtrate and may be recycled back through the filter. This mode of operation may be used for feeds with solids that cause a risk of "blinding." Blinding is an accumulation of retentate on the membrane that fouls and/or reduces the effectiveness of a filter. With dead end filtration, solid material can quickly blind the filter surface, and feed flow can no longer pass through the membrane, rendering the filter ineffective. With crossflow filtration, the tangential motion of the bulk of the fluid across the membrane causes trapped particles on the filter surface to be removed by the tangential feed flow. This means that a crossflow filter can operate continuously with reduced blinding at a relatively high solids load compared to dead end filters.

Crossflow filter devices can take many shapes, including plates, hollow fibers, tubes and spirals. A spiral crossflow filtration device may include filter media wrapped around a permeate tube in a "jelly roll" type design. When looking at the end of a "spiral" filter, the end edges of the individual leaves of the filter element make a plane curve traced by a point circling about the center axis but at ever-greater distances from it. Each "leaf" is essentially hollow, like an "envelope" made out of filter media. In a spiral crossflow filter, the feed fluid flows parallel to the permeate tube. The feed flow enters one of the leaf "envelopes" across the filter media. The filtered fluid, or permeate, goes through the media and spirals between the media inside the leaf "envelope" and into the permeate tube. The permeate exits the filter through the permeate tube, and is kept separate from the remaining feed flow which exits the filter separately.

Crossflow membrane filtration technology has been used widely in industry globally. Cross flow filtration may be used, for example, in microfiltration, ultrafiltration, nanofiltration, and reverse osmosis. There is still a need, however, for improved cross-flow filter devices.

BRIEF SUMMARY

Embodiments described in the present disclosure include a spiral cross-flow filter including an outer cylindrical shell and a permeate cylindrical tube coaxially aligned within the shell and radially offset therefrom. The filter may also include an annular pleated filter element disposed within an annulus between the outer shell and the permeate tube. The filter element may include a composite filter material including a first layer of a membrane material adjacent the outer shell, and a second layer of a permeate spacer material adjacent the permeate tube. The filter may also include a first layer of a feed spacer, a second layer of membrane, and a third layer of permeate spacer. The pleats of the filter element may define a plurality of circumferentially spaced radial leaves, each including an attachment at its proximal edge to the permeate tube. The plurality of leaves may wrap around the permeate tube in a "spiral" configuration.

It is understood that the disclosed invention is not limited to the embodiments described in this Summary. The invention is intended to encompass modifications and other subject matter that are within the scope of the invention as defined solely by the claims.

BRIEF DESCRIPTION OF THE FIGURES

Various characteristics and features of the disclosed non-limiting embodiments may be better understood by reference to the following figures, in which.

DETAILED DESCRIPTION

It is to be understood that the various descriptions of the embodiments disclosed herein have been simplified to illustrate only those elements, features, and aspects that are relevant to a clear understanding of the disclosed embodiments, while eliminating, for purposes of clarity, other elements, features, and aspects. Persons having ordinary skill in the art, upon considering the present description of the disclosed embodiments, will recognize that other elements and/or features may be desirable in a particular implementation or application of the disclosed embodiments. However, because such other elements and/or features may be readily ascertained and implemented by persons having ordinary skill in the art upon considering the present description of the disclosed embodiments, and are therefore not necessary for a complete understanding of the disclosed embodiments, a description of such elements and/or features is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material, in whole or in part, that is said to be incorporated by reference herein, is incorporated herein in its entirety, but only to the extent that the incorporated material does not conflict with existing definitions, statements, or other disclosure material expressly set forth in this disclosure. As such, and to the extent necessary, the express disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

The present disclosure includes descriptions of various embodiments, including various different features, aspects, and characteristics of the embodiments. It is to be understood that all embodiments described herein are exemplary, illustrative, and non-limiting. Thus, the invention is not limited by the description of the various exemplary, illustrative, and non-limiting embodiments. Rather, the invention is defined solely by the claims, which may be amended to recite any features, aspects, and characteristics expressly or inherently described in or otherwise expressly or inherently supported by the present disclosure.

In addition, the figures presented herein represent non-limiting embodiments of the disclosure. The figures are not drawn to scale or proportion and are provided solely to aid in the understanding of the various embodiments, and should not be interpreted to limit the scope of the present disclosure.

The embodiments described herein generally relate to devices for removing contaminants from a fluid, such as, for example, a liquid (e.g., water) or a gas (e.g., air). The embodiments described herein may also find utility in connection with other fluids. For example, a fluid to be purified or otherwise filtered may be any chemical, industrial, or biological fluid. As generally used herein, "contaminant" may refer to any undesirable agent in a fluid. For example, "contaminants" may include, but are not limited to, any solids and debris, heavy metals, polyaromatics, halogenated polyaromatics, minerals, vitamins, microorganisms or microbes (as well as reproductive forms of microorganisms, including cysts and spores) including viruses, fungi (for example, molds and yeasts), proteins and nucleic acids, pesticides and other agrochemicals including organic chemicals, inorganic chemicals, and dissolved salts.

As generally used herein, "removing contaminants" or "reducing contaminants" refers to disarming or removing one or more contaminants in the fluid, whether by physically or chemically removing, reducing, inactivating the contaminants, or otherwise rendering the one or more contaminants harmless. In addition, the present disclosure further envisions various aspects wherein particular embodiments include removing one or more contaminants but specifically excludes one or more types, groups, categories, or specifically identified contaminants as well. For example, in various aspects, "removing contaminants" may include one or more particular contaminants, or may include only one particular contaminant, or may specifically exclude one or more contaminants.

Figure 1:
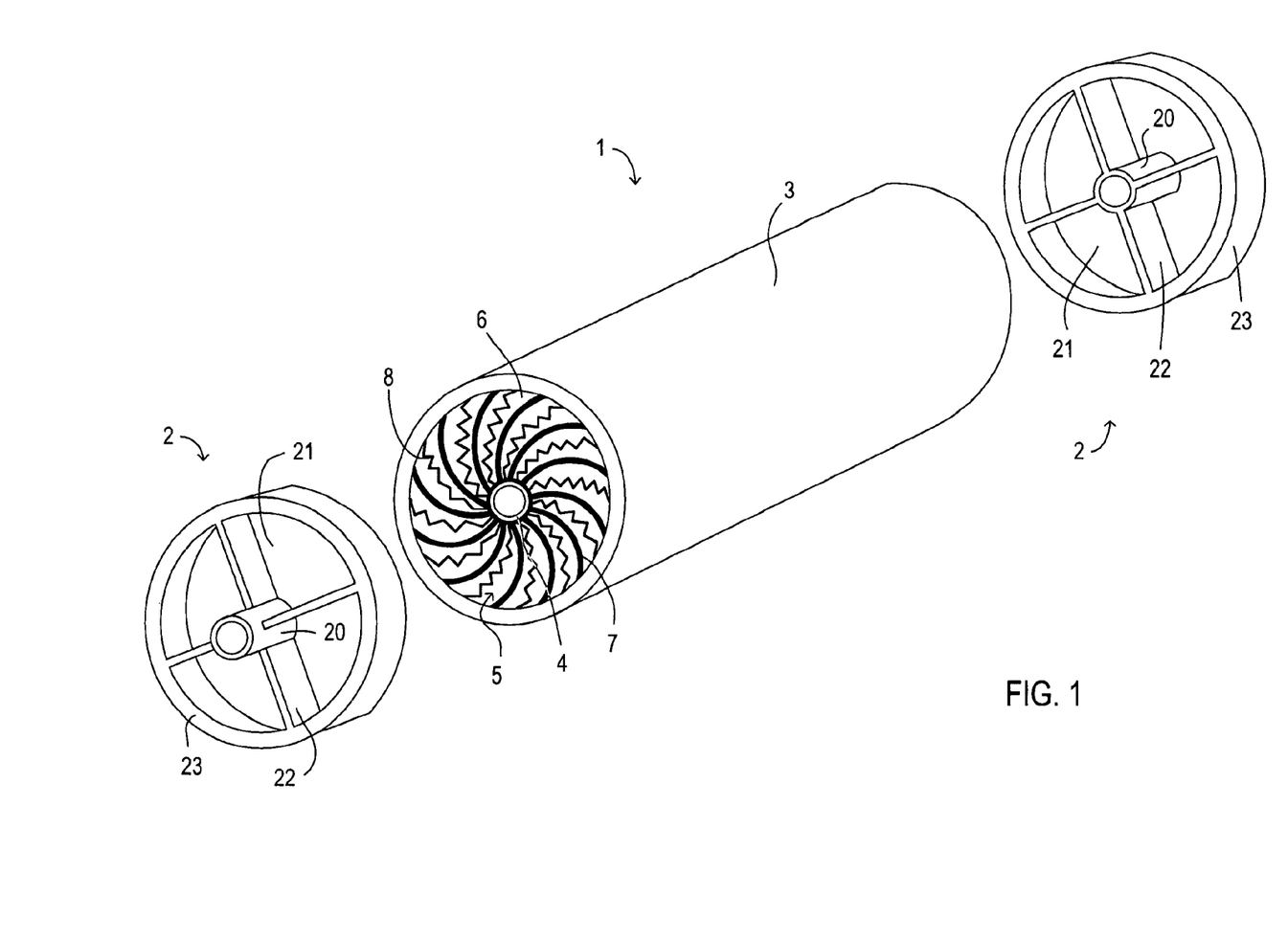
FIG. 1 is a schematic exploded perspective view of an embodiment of a spiral cross-flow filter according to the present disclosure.

FIG. 1 depicts an embodiment of a spiral cross-flow filter 1 according to various embodiments of the present disclosure. These embodiments have an outer cylindrical shell 3 and a porous permeate cylindrical tube 4 coaxially aligned within the shell 3 and radially offset therefrom. These embodiments further have an annular pleated filter element 5 disposed within an annulus 6 between the outer shell 3 and the permeate tube 4. The filter element 5 is formed from a plurality of leaves 7 and a plurality of feed spacers 8. For ease of illustration, the leaves 7 and feed spacers 8 shown in FIG. 1 are not completely wrapped and packed tightly in "spiral" or "jellyroll" configuration. Various embodiments of the cross-flow filter 1 may include end caps 2.

Figure 2:
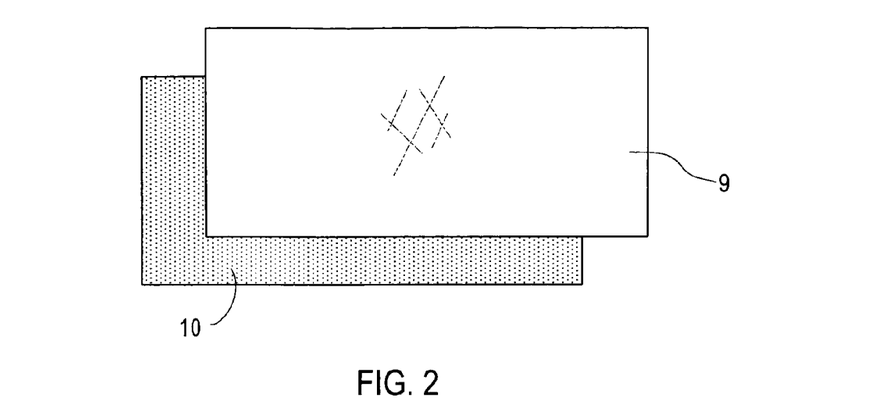
FIG. 2 is a schematic view of a membrane and permeate spacer material that make up a composite filter element of a cross-flow filter as shown in FIG. 1.
Figure 3:
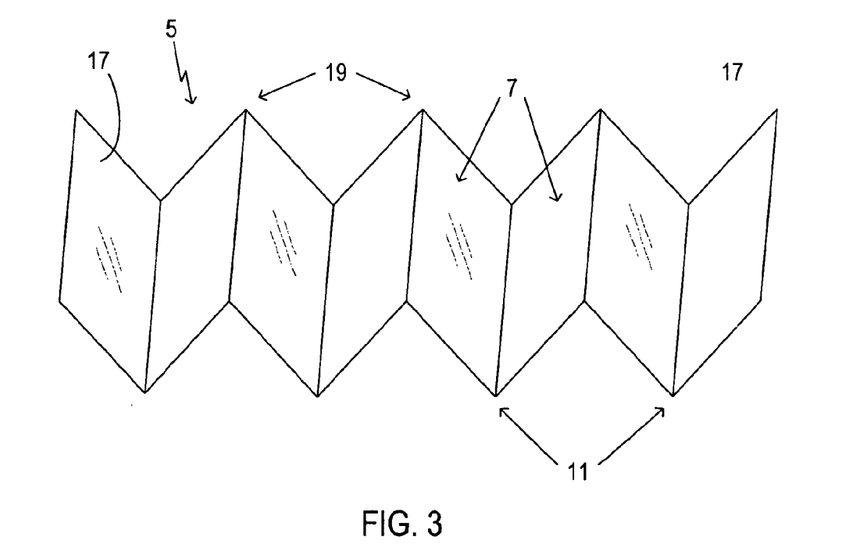
FIG. 3 is a schematic view of a composite sandwich of the materials shown in FIG. 2, illustrated in a partially pleated configuration.
Figure 4:
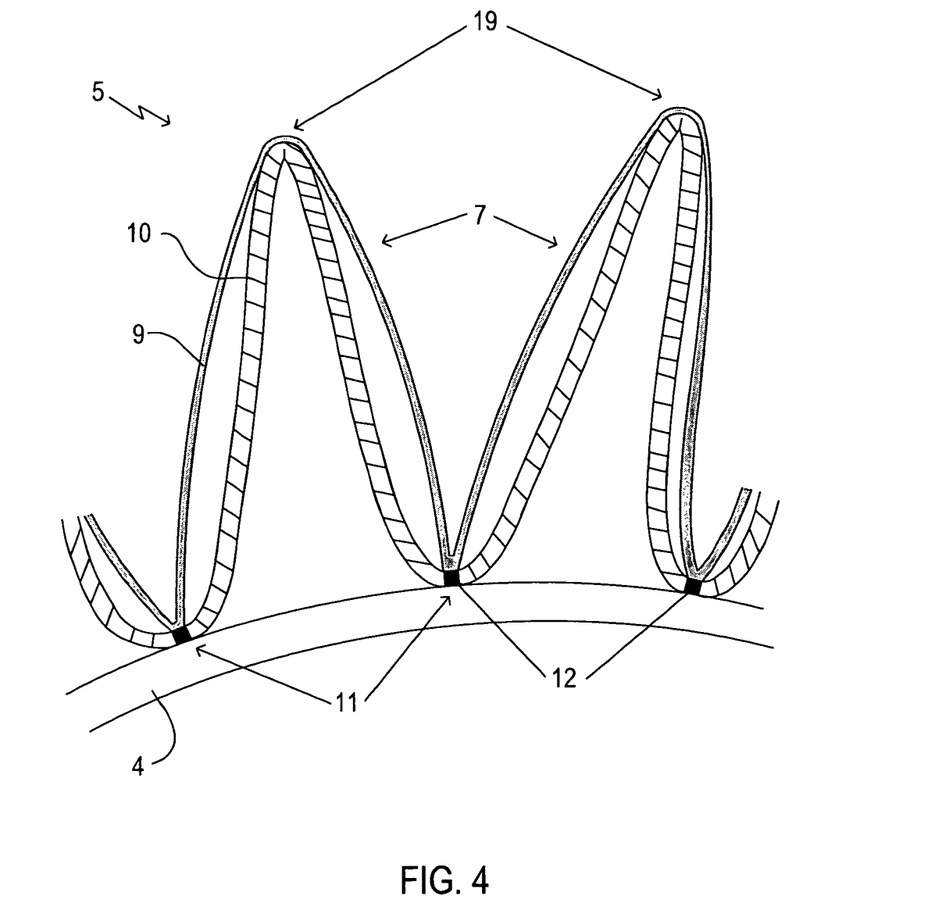
FIG. 4 is a schematic partial cross-sectional view of the crossflow filter shown in FIG. 1, illustrating an edge of a pleated composite sandwich of a filter element attached to the permeate tube.

Referring now to FIG. 2, a filter element may include a composite sandwich having at least a first layer of membrane material 9, and a second layer of a permeate spacer material 10. In a spiral filter as illustrated in FIG. 1, the first layer of a membrane material 9 may be adjacent the outer shell 3, and the second layer of permeate spacer material 10 may be adjacent the permeate tube 4. Referring now to FIG. 3, a composite sandwich filter element 5 may include both layers and may be is pleated. A pleated filter element 5 may be placed around a permeate tube 4. Once placed around the permeate tube 4, the pleats of the filter element 5 may define a plurality of continuous, circumferentially spaced radial leaves 7. Once the filter element 5 is placed around the permeate tube 4, the leaves 7 may be wrapped around the permeate tube 4 in a uniform direction. The leaves 7 may be maintained in the wrapped position by the outer shell 3, and/or the end caps 2, for example. In various embodiments, the filter element 5 may not be attached to the permeate tube 4. In various embodiments, each leaf 7 may have an attachment 12 at its proximal edge 11 to the permeate tube 4. Once an attachment is formed, the plurality of leaves 7 may be wrapped around the permeate tube 4 in a uniform direction. FIG. 4 shows a partial cross-sectional view of a filter element 5 attached to a permeate tube 4. FIG. 4 shows only a portion of the permeate tube 4, and only two of a plurality of leaves 7. The filter element 5 includes attachments 12 at the proximal edges 11. Once attached to the permeate tube 4, each leaf 7 can be described as a "hollow envelope," having two layers 9,10.

Figure 6:
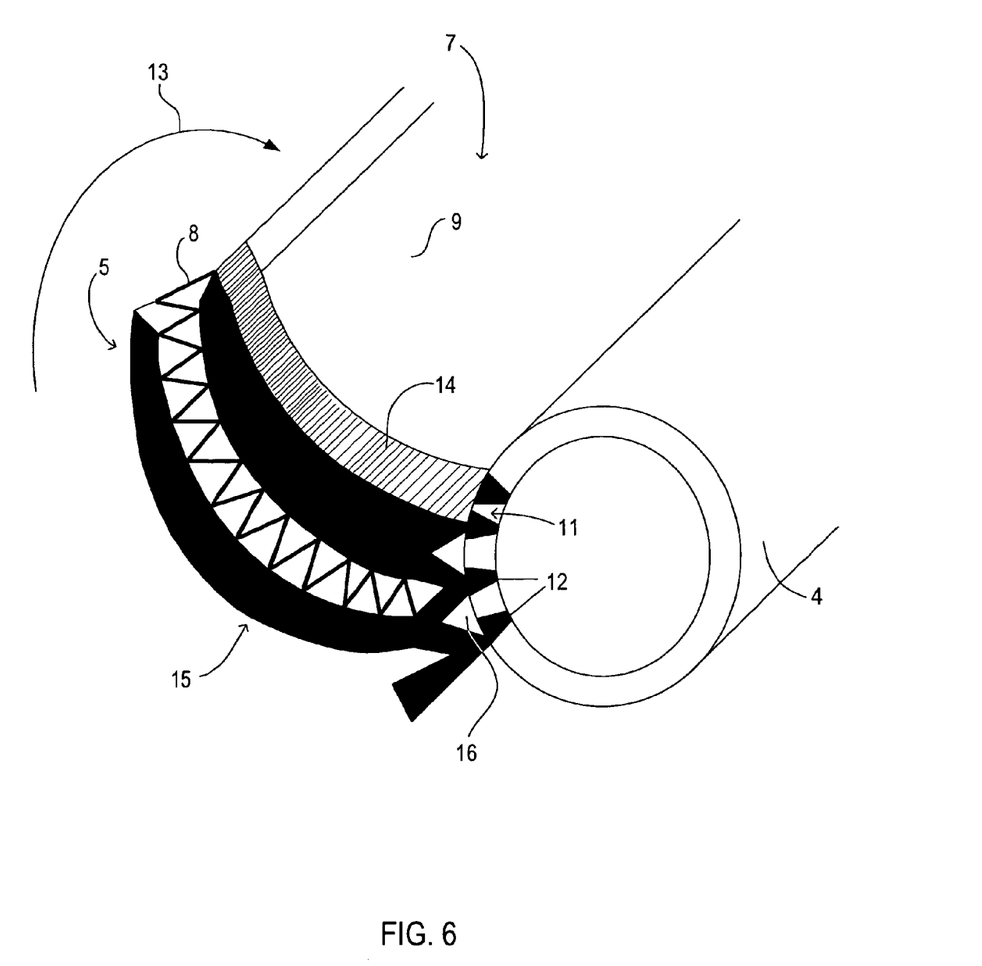
FIG. 6 is a schematic partial perspective view of the crossflow filter shown in FIG. 1, illustrating an edge of a pleated composite sandwich of a filter element attached to the permeate tube and having a feed spacer.

FIG. 6 shows two leaves 7 of a filter element 5 attached to a permeate tube 4. Though only two leaves 7 are shown, various embodiments may have a greater number of leaves 7 attached continuously around the circumference of the permeate tube 4. In FIG. 6, the leaves 7 are partially wrapped around the permeate tube 4 in the uniform direction shown by the arrow 13, but are not wrapped completely in the final "spiral" or "jelly roll" configuration. The filter element 5 shown in FIG. 6 further includes a feed spacer 8 inserted in between the two leaves 7. In various embodiments, the filter element 5 includes a feed spacer 8 between each of the plurality of leaves 7. The purpose of the feed spacer 8 is to maintain separation between the leaves 7 to establish a feed flow path through the length of the filter element 5. The cross-flow facilitated by the feed spacers 8 helps to keep the membrane 9 from becoming fouled or blinded with aggregate retentate.

Figure 5:
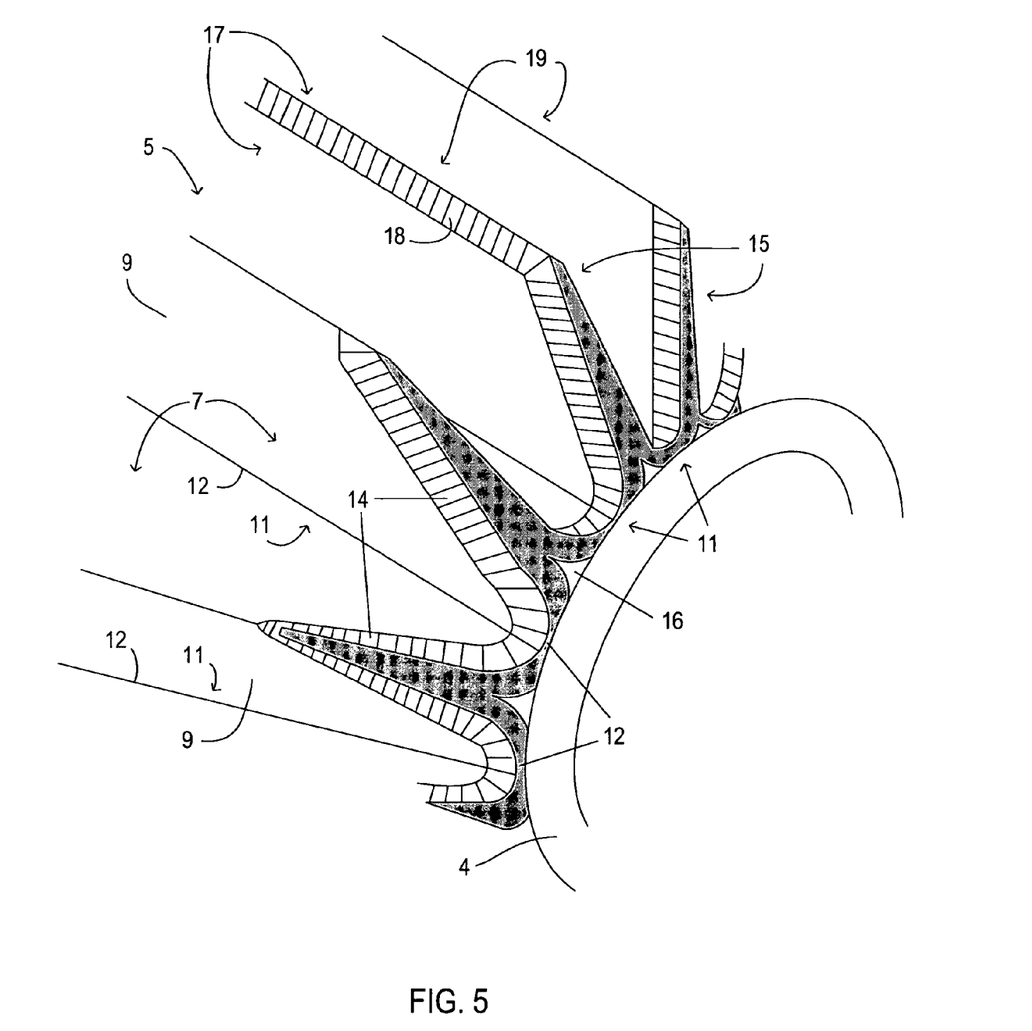
FIG. 5 is a schematic partial perspective view of the crossflow filter shown in FIG. 1, illustrating an edge of a pleated composite sandwich of a filter element attached to the permeate tube.

FIGS. 5 and 6 show partial perspective views of an end of a permeate tube 4 and filter element 5. In FIG. 5, the leaves 7 have not yet been wrapped around the permeate tube 4. In FIG. 6, the leaves 7 are partially wrapped around the permeate tube 4. Referring now to FIGS. 5 and 6, in various embodiments, each of the plurality of leaves 7 has a bond 14 at an edge 15 (inlet edge and/or an outlet edge), the bond 14 sealing together membrane material 9 and the permeate spacer material 10. As used herein, the term "seal" or "sealed" means that a substantially fluid impervious seal is formed, but the materials are not necessarily bonded together. As used herein, the term "bond" or "bonded" means that the materials described are physically and/or chemically bonded together, for example, with an adhesive, or some bonding technique, such as, for example, ultrasonic welding, such that a substantially fluid impervious seal is formed. The leaves 7 shown in FIGS. 5 and 6 also include an attachment 12 along proximal edge 11 of the leaves 7. Once bonded at the edges 15 and attached to the permeate tube 4, a "hollow envelope" having two layers is formed. The edge bond 14 can be formed after pleating and before being attached to the permeate tube 4, or after being attached to the permeate tube 4. The edge 15 of each leaf 7 is bonded together, yet the proximal edges 11 are slightly separated where they form an attachment 12 to the permeate tube 4. Therefore, in various embodiments, a small gap 16 may be formed near the proximal edges 11 of each leaf 7. In such embodiments, the gap 16 may be covered and sealed by the inner portion 20 of an end cap 2. In various embodiments, the end cap 2 is bonded to a portion of each leaf 7, covering and sealing the gap 16.

Referring now to FIG. 5, because the plurality of leaves 7 are formed from at least one pleated filter element 5, the leaves 7 are continuous except for where the ends 17 of the pleated filter element 5 meet. In FIG. 5, each end 17 of the filter element 5 makes up half of a leaf 7. Therefore, in various embodiments, at least one leaf 7 will have a bond 18 at the distal edge 19, joining the two ends 17 of the pleated filter element 5 and forming a leaf 7 with the ends 17. In various embodiments (not shown), each end 17 of the pleated filter element 5 will be the end of a complete leaf 7, and will not be a half of a leaf 7. In such an embodiment, the end 17 forms an attachment 12 at the proximal edge 11. The ends 17 of the filter element 5 will end in a complete leaf 7, and no leaf 7 will be formed by joining the ends 17 of a pleated filter element 5.

In various embodiments, the bonds 14, 18 and the attachments 12 do not comprise an adhesive. In various embodiments, the bonds 14, 18 and the attachments 12 are selected from the group consisting of an ultrasonic bond, a thermal bond, an IR bond, a radio frequency bond, and a microwave bond. In various embodiments, the bonds 14, 18 and the attachments 12 are an ultrasonic bond. In various embodiments, the attachments 12 are an ultrasonic bond that bonds the membrane 9 material and the permeate spacer 10 material of each leaf 7 at the proximal edge 11 to the permeate tube 4. In various embodiments, the bonds 14, 18 are ultrasonic bonds that bond the membrane 9 material and the permeate spacer 10 material of each leaf 7 at the edge 15 and a distal edge 19. In various embodiments, filter components that include an ultrasonic bond may be formed from the same base polymer, including any of the polymers recited herein. In various embodiments, the components may be formed from base polymers that are compatible for the purpose of ultrasonic bonding or welding. These components include the membrane 9 material, permeate spacer 10 material, permeate tube 4, end cap 2 and outer shell 3. These components may also include the feed spacer 8 and any other component described herein.

As shown in FIGS. 1 and 6, in various embodiments, the feed spacer 8 is formed from a corrugated thermoplastic sheet. The corrugations in the feed spacer 8 establish flow channels that create less flow restriction in the feed flow path compared to flat netting or other materials. It was surprisingly discovered that the use of a corrugated feed spacer 8 helps to balance the flow across the filter 1 allowing the filter 1 to handle higher cross flow rates, higher viscosity fluids, and higher amounts of feed solids while at the same time helping to avoid blinding. In various embodiments, the corrugated thermoplastic sheets forming the feed spacers 8 are porous. As used herein, "porous" includes a range of openings from microscopic apertures to macroscopic apertures. In various embodiments, the openings may be formed by an open lattice comprising an extruded thermoplastic net, for example. The openings may be formed in situ as the feed spacer 8 material is made, or the openings may be created by mechanical or chemical methods (e.g., punching, boring, drilling, perforating, and the like) after the feed spacer 8 material is made. In various embodiments, the corrugated thermoplastic sheets forming the feed spacers 8 are non-porous and substantially fluid impervious.

In various embodiments, the feed spacer 8 is formed from a corrugated thermoplastic sheet that is non-textured. As used herein, the term "non-textured" includes a surface that is substantially smooth on a macroscopic level. In various embodiments, the corrugated thermoplastic sheet is textured. As used herein, the term "textured" includes a surface that has raised features visible on a macroscopic level. A textured sheet may help to create turbulence in the fluid flow which may aid in the operation of the spiral crossflow filter as described herein. Examples of corrugated feed spacers may be found in U.S. Pat. No. 4,834,881 to Sawada et al., incorporated by reference herein.

In various embodiments, the corrugated thermoplastic sheet has an amplitude from 0.02 inches to 0.25 inches, and a wavelength from 0.02 inches to 0.25 inches. In various other embodiments, the corrugated thermoplastic sheet has an amplitude from 0.05 inches to 0.15 inches, and a wavelength from 0.05 inches to 0.15 inches. In various embodiments, the feed spacer 8 is made from a thermoplastic selected from the group consisting of polyvinylidene fluoride, polypropylene, polyester, polyethylene, polyethersulfone, polysulfone, polyacrylonitrile, nylon, ethylene chlorotrifluoroethylene, fluoroethylenepropylene, perfluoroalkoxy, polyetheretherketone, polysynidilenesulfide, polycarbonate, and co-polymers and blends of any thereof.

Figure 7:
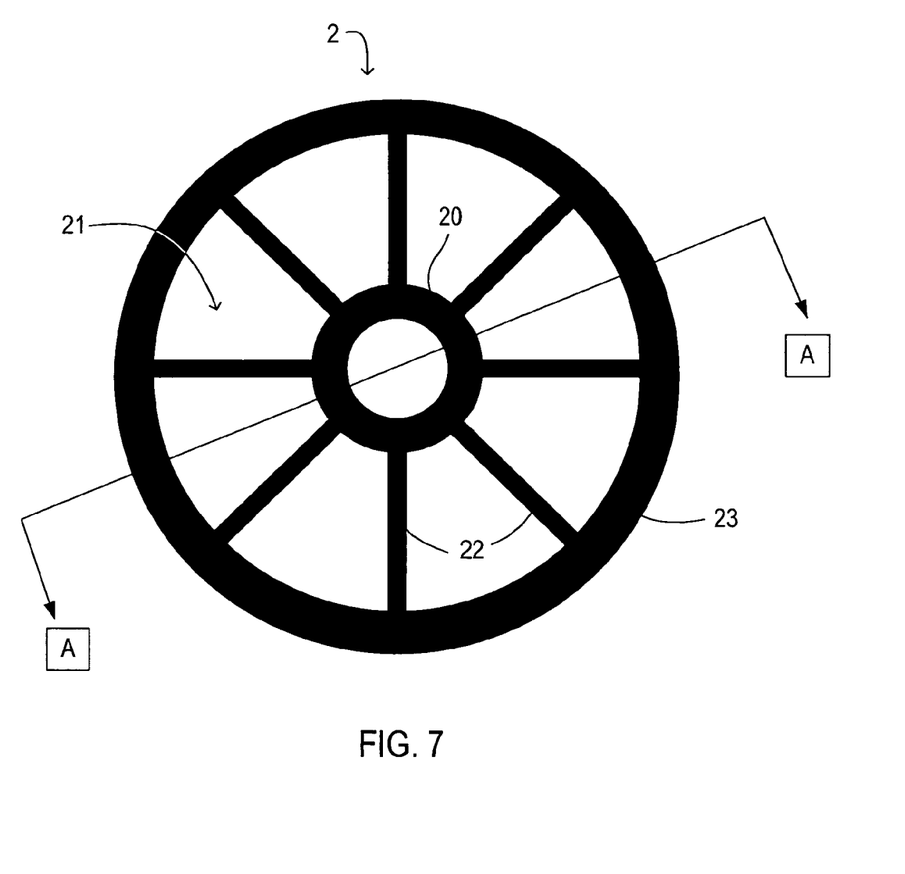
FIG. 7 is a schematic end view of an end cap of the crossflow filter shown in FIG. 1.

FIG. 7 shows an end view of an end cap 2. Various embodiments may include an inlet end cap 2 on an inlet end of the permeate tube 4, and an outlet end cap 2 on an outlet end of the permeate tube 4. The end caps 2 have an inner portion 20 sealing the inlet end or outlet end of the permeate tube 4. In various embodiments, the inner portion 20 also seals gaps 16 near the proximal edges 11 of the leaves 7, and may be bonded to a portion of the leaves 7. The end cap 2 also has at least one open portion 21 directing the inlet fluid flow towards inlet edges 15 of the plurality of leaves 7, or directing an outlet fluid flow from the outlet edges 15 of the plurality of leaves 7. Various embodiments may include an outlet end cap 2 attached to at least an outlet end of the permeate tube 4, the outlet end cap 2 having structures configured to separate the permeate fluid flow flowing from the permeate tube 4 from the outlet fluid flow flowing from the outlet edges 15 of the plurality of leaves 7.

Figure 8:
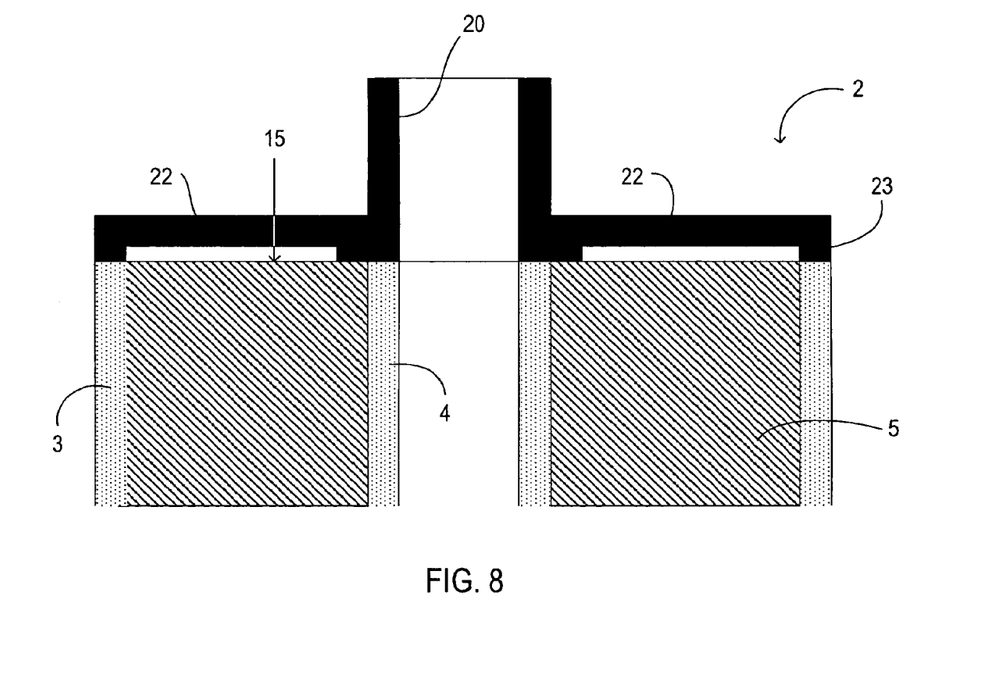
FIG. 8 is a schematic sectional view taken along line "A-A" in FIG. 7 and showing an end cap attached to a spiral filter.

Referring now to FIG. 8, in various embodiments, the end cap 2 is bonded to and seals the end of the permeate tube 4. In various embodiments, on the inlet side, the inner portion 20 of the end cap 2 is closed, such that no fluid enters the permeate tube 4 at the inlet end. On the outlet side, the inner portion 20 of the end cap 2 is open, such that permeate may exit the filter 1. In various embodiments, both the inlet and outlet ends of the permeate tube 4 are open, and not blocked by the inner portion 20 of the end caps 2. In various embodiments, a middle portion of the permeate tube 4 is blocked. In such an embodiment, fluid flows in the inlet end of the permeate tube 4. The blocked middle portion forces the fluid out of the permeate tube and into the leaves 7. Once in the leaves, the fluid flows parallel to the permeate tube 4 and remains in the leaves. In such an embodiment, the filtered fluid can pass from feed side to permeate side or from permeate side to feed side. The fluid re-enters the permeate tube 4 downstream from the blocked middle portion of the permeate tube. In various other embodiments, both ends of the permeate tube 4 are open and both ends are outlet ends. This allows for a reduced fluid flow restriction since fluid crossing the membrane 9 and entering the leaves 7 and then the permeate tube 4 may exit the permeate tube 4 at either end.

In FIG. 8, the filter element 5 is indicated by the shaded area. A plurality of leaves 7 are wrapped around the permeate tube 4 in a uniform direction, however, individual leaves 7 are not shown in this figure. In embodiments as illustrated in FIG. 8, the 22 of the end cap 2 are not bonded to the edges 15 of the leaves 7. In various embodiments, the ribs 22 are bonded to the edges 15 of the plurality of leaves 7 of the filter element 5. As previously mentioned, the inner portion 20 of the end cap 2 may also seal or be bonded to a portion of the leaves 7 that may include a gap 16.

The outer cylindrical shell 3 may be made of a rigid thermoplastic, fiberglass, or metal tube, or may be made of a non-rigid material, such as, for example, but not limited to, tape. In various embodiments, the outer cylindrical shell 3 may be formed after the leaves 7 have been wrapped around the permeate tube 4. In such embodiments, the shell 3 may be formed by wrapping a flexible material such as fiberglass around the filter element 5. In either case, the outer portion 23 of the end cap 2 forms a seal with the outer cylindrical shell 3. In various embodiments, the outer portion 23 of the end cap 2 may further be bonded to the shell 3. In various embodiments, the inlet end cap 2 and outlet end cap 2 are bonded to at least the permeate tube 4, and possibly also the shell 3, by a method selected from the group consisting of ultrasonic welding, thermal bonding, IR bonding, radio frequency bonding, and microwave bonding.

In operation, feed flow is directed at the inlet edges 15 of the leaves 7 of the filter element 5. The feed flow may enter the spiral filter 1 through openings 21 in the end cap 2. Feed flow is directed in between the leaves 7 at the inlet edges 15. Space may be maintained in between the leaves 7 by feed spacers 8. Filtrate may pass through the membrane 9 and enter the leaf 7 at any point along any of the leaves 7 that are wrapped around the permeate tube 4. The filtrate may be forced through the membrane 9 by a pressure differential, concentration gradient, or any other means. Once filtrate has passed through the membrane 9 of a leaf 7, the filtrate remains within that leaf 7. The filtrate is forced to flow towards the permeate tube 4 while inside of the leaf 7. While inside of the leaf 7, the filtrate must eventually pass through the permeate spacer 10 so that it can enter the porous permeate tube 4. The permeate tube 4 is porous for at least a portion of its length such that it is in fluid communication with the inside of each leaf 7. Once inside the permeate tube 4, the filtrate flows out of the filter 1 through the outlet end of the permeate tube 4. The filtrate is kept separate from feed flow exiting the filter 1 that has not entered a leaf 7. Feed flow that has not entered a leaf 7 exits the spiral filter 1 past the outlet edges 15 of the leaves 7 of the filter element 5. A constant stream of unfiltered feed flowing tangentially to the leaves 7 helps to remove or carry away retentate from the filter surface membrane 9 and keeps the membrane 9 from blinding. In various embodiments, the remaining feed flow exits the filter 1 through openings 21 in an outlet end cap 2. The unfiltered feed flow may eventually be recycled back into the spiral filter 1 through the inlet end cap 2.

In various embodiments, a filter as described herein may have a cross-flow rate (measured as fluid velocity) of greater than or equal to 3 M/sec. In various embodiments, a filter as described herein may have a cross-flow rate of greater than or equal to 5 M/sec. In various embodiments, a filter as described herein may have a cross-flow rate of less than or equal to 1 M/sec. In various embodiments, a filter as described herein may have a cross-flow rate from 1 M/sec to 5 M/sec or from 1 M/sec to 3 M/sec. In various other embodiments, a filter as described herein may have a cross-flow rate from 20 cm/sec to 100 cm/sec.

In various embodiments, a cross-flow filter as described herein may have a ratio of leaf height to spiral diameter of less than or equal to 3, in some embodiments less than or equal to 2.5, and in other embodiments less than or equal to 2. As used herein, "leaf height" refers to the distance from a point between the proximal edges of a leaf to the distal edge of a leaf when the leaf extends radially from a permeate tube, for example, as shown in FIGS. 4 and 5. As used herein, "spiral diameter" refers to the length of the diameter of a filter as described herein, measured from the outside edge of the permeate tube to the inside edge of the outer cylindrical shell.

A filter as described herein may be used for a variety of filtering applications. In various embodiments, the membrane material of a spiral crossflow filter may be made from a material selected from the group consisting of a microfiltration material, an ultrafiltration material, a nanofiltration material, and a reverse osmosis material. As used herein, a microfiltration material is defined as a porous filter material that removes the majority of particles less than 10 microns down to 0.01 microns, typically at a greater than 90% efficiency. An ultrafiltration material, as used herein, is defined as a porous filter material that, in addition to performing like a microfiltration material, removes the majority of molecules from about 1 million Daltons down to less than 1,000 Daltons, typically at a greater than 90% efficiency. As used herein, a nanofiltration material is defined as a porous filter material that, in addition to performing as an ultrafiltration material, removes the majority of multi-valent ions, typically at a greater than 90% efficiency. As used herein, a reverse osmosis material is defined as a porous filter material that, in addition to performing as a nanofiltration material, removes the majority of single valent ions, typically at a greater than 90% efficiency.

A filter as described herein may be useful with any known material suitable for the types of filtration listed herein. In various embodiments, a membrane material may be selected the group consisting of a microfiltration material and an ultrafiltration material. In various embodiments, the membrane material may be formed from a material selected from the group consisting of polyvinylidene fluoride, polypropylene, polyester, polyethylene, polyethersulfone, polysulfone, polyacrylonitrile, nylon, ethylene chlorotrifluoroethylene, fluoroethylenepropylene, perfluoroalkoxy, polytetrafluorethylene, polyetheretherketone, polysynidilenesulfide, and polycarbonate. In various embodiments, the membrane material may be selected from the group consisting of polyvinylidene fluoride and polyethersulfone.

The present disclosure has been written with reference to various exemplary, illustrative, and non-limiting embodiments. However, it will be recognized by persons having ordinary skill in the art that various substitutions, modifications or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining, modifying, or reorganizing any of the disclosed steps, ingredients, constituents, components, elements, features, aspects, and the like, of the embodiments described herein. Thus, this disclosure is not limited by the description of the various exemplary, illustrative, and non-limiting embodiments, but rather solely by the claims. In this manner, Applicants reserve the right to amend the claims during prosecution to add features as variously described herein.

What is claimed is:

1. A spiral cross-flow filter, comprising:
    an outer cylindrical shell;
    a permeate cylindrical tube coaxially aligned within the shell and radially offset therefrom; and
    an annular pleated filter element disposed within an annulus between the outer shell and the permeate tube, the filter element comprising a composite filter material comprising:
        a first layer of a membrane material adjacent the outer shell, and
        a second layer of a permeate spacer material adjacent the permeate tube,
        wherein the membrane material and the permeate spacer material are bonded together at an inlet edge and an outlet edge of the filter element;
    the pleats of the filter element defining a plurality of circumferentially spaced radial leaves, wherein the plurality of leaves wrap around the permeate tube in a uniform direction, wherein each leaf comprises an attachment to the permeate tube at a proximal edge of the leaf, and wherein each attachment comprises a direct bond between the permeate tube, the membrane material, and the permeate spacer material.

2. The filter of claim 1, further comprising:
    a feed spacer inserted in between each of the plurality of leaves;
    an inlet end cap attached to at least an inlet end of the permeate tube, comprising:
        a closed portion sealing the inlet end of the permeate tube; and
        an open portion directing the inlet fluid flow towards inlet edges of the plurality of leaves; and
    an outlet end cap attached to at least an outlet end of the permeate tube, comprising a means of separating a permeate fluid flow flowing from the permeate tube from an outlet fluid flow flowing from the outlet edges of the plurality of leaves.

3. The filter of claim 2, wherein the inlet end cap is bonded to and seals the inlet end of the permeate tube and the inlet edges near the permeate tube of the plurality of leaves, and further wherein the outlet end cap is bonded to the outlet end of the permeate tube and is also bonded to and seals outlet edges of the plurality of leaves near the permeate tube.

4. The filter of claim 3, wherein the inlet end cap and outlet end cap are bonded by a method selected from the group consisting of ultrasonic welding, thermal bonding, IR bonding, radio frequency bonding, and microwave bonding.

5. The filter of claim 1, wherein the bonds do not comprise an adhesive.

6. The filter of claim 5, wherein the bonds are selected from the group consisting of an ultrasonic bond, a thermal bond, an IR bond, a radio frequency bond, and a microwave bond.

7. The filter of claim 6, wherein the bonds comprise an ultrasonic bond.

8. The filter of claim 2, wherein the feed spacer comprises a corrugated thermoplastic sheet.

9. The filter of claim 8, wherein the corrugated thermoplastic sheet is porous.

10. The filter of claim 8, wherein the corrugated thermoplastic sheet is non-porous.

11. The filter of claim 8, wherein the corrugated thermoplastic sheet is non-textured.

12. The filter of claim 8, wherein the corrugated thermoplastic sheet is textured.

13. The filter of claim 8, wherein the corrugated thermoplastic sheet has an amplitude from 0.02 inches to 0.25 inches, and a wavelength from 0.02 inches to 0.25 inches.

14. The filter of claim 13, wherein the corrugated thermoplastic sheet has an amplitude from 0.05 inches to 0.15 inches, and a wavelength from 0.05 inches to 0.15 inches.

15. The filter of claim 1, further comprising a feed spacer comprising a corrugated thermoplastic sheet comprising at least one thermoplastic selected from the group consisting of polyvinylidene fluoride, polypropylene, polyester, polyethylene, polyethersulfone, polysulfone, polyacrylonitrile, nylon, ethylene chlorotrifluoroethlyene, fluoroethylenepropylene, perfluoroalkoxy, polyetheretherketone, polysynidilenesulfide, and polycarbonate.

16. The filter of claim 1, wherein the plurality of leaves comprises a ratio of leaf height to spiral diameter of less than or equal to 2.5, wherein the leaf height is the distance from a point between the proximal edges of a leaf to the distal edge of a leaf when the leaf is radially extended from the permeate tube, and wherein the spiral diameter is the distance from the outside edge of the permeate tube to the inside edge of the outer cylindrical shell.

17. The filter of claim 1, wherein the membrane material is selected the group consisting of a microfiltration material, an ultrafiltration material, a nanofiltration material, and a reverse osmosis material.

18. The filter of claim 1, wherein the membrane material is selected the group consisting of a microfiltration material and an ultrafiltration material.

19. The filter of claim 1, wherein the membrane material comprises at least one polymer selected from the group consisting of polyvinylidene fluoride, polypropylene, polyester, polyethylene, polyethersulfone, polysulfone, polyacrylonitrile, nylon, ethylene chlorotrifluoroethlyene, fluoroethylenepropylene, perfluoroalkoxy, polytetrafluorethylene, polyetheretherketone, polysynidilenesulfide, and polycarbonate.

20. The filter of claim 1, wherein the membrane material comprises at least one polymer selected from the group consisting of polyvinylidene fluoride and polyethersulfone.

21. The filter of claim 1, wherein the bonds between the permeate tube, the membrane material, and the permeate spacer material are separated along the circumference of the permeate tube, thereby forming a gap at the proximal edge of each leaf adjacent to the permeate tube at the inlet edge and the outlet edge of the filter element.

22. The filter of claim 21, further comprising:
an inlet end cap bonded to the outer cylindrical shell and an inlet end of the permeate tube; and
an outlet end cap bonded to the outer cylindrical shell and an outlet end of the permeate tube;
wherein the inlet end cap and the outlet end cap each comprise closed inner portions that cover and seal the gaps at the inlet edge and the outlet edge of the filter element.

* * * * *